(12) United States Patent
Poon

(10) Patent No.: US 7,730,525 B2
(45) Date of Patent: Jun. 1, 2010

(54) METHOD, SYSTEM, AND COMPUTER PROGRAM PRODUCT FOR LIMITING AUTHORIZATION OF AN EXECUTABLE ACTION TO AN APPLICATION SESSION

(75) Inventor: Shiu Fun Poon, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1170 days.

(21) Appl. No.: 11/158,821

(22) Filed: Jun. 22, 2005

(65) Prior Publication Data

US 2006/0294581 A1 Dec. 28, 2006

(51) Int. Cl.
*G06F 15/16* (2006.01)
*G06F 9/44* (2006.01)
(52) U.S. Cl. .......................... 726/6; 717/171
(58) Field of Classification Search ................ 726/2–3, 726/6, 29–30; 713/176; 717/127, 171, 176; 709/22
See application file for complete search history.

(56) References Cited

U.S. PATENT DOCUMENTS

| 5,014,234 | A | * | 5/1991 | Edwards, Jr. ................. 726/33 |
| 5,958,006 | A | * | 9/1999 | Eggleston et al. ........... 709/219 |
| 6,008,737 | A | * | 12/1999 | Deluca et al. ............... 340/5.74 |
| 6,272,636 | B1 | * | 8/2001 | Neville et al. ............... 713/189 |
| 7,231,199 | B2 | * | 6/2007 | Adams et al. ................ 455/403 |
| 2004/0044895 | A1 | * | 3/2004 | Reasons et al. ............. 713/182 |
| 2004/0117784 | A1 | * | 6/2004 | Endoh ......................... 717/169 |
| 2006/0117314 | A1 | * | 6/2006 | Sato ............................ 717/174 |
| 2006/0150256 | A1 | * | 7/2006 | Fanton et al. ................. 726/27 |

* cited by examiner

*Primary Examiner*—Minh Dieu Nguyen
(74) *Attorney, Agent, or Firm*—Daniel McLoughlin; Hoffman Warnick LLC

(57) ABSTRACT

The present invention provides a method, system, and computer program product for limiting authorization of an executable action to an application session. A method in accordance with an embodiment of the present invention comprises: generating an alert in response to an execution of an action in an application; and allowing a user to temporarily authorize the execution of the action for a current session of the application. The authorization for the execution of the action is removed when the current session of the application ends.

10 Claims, 4 Drawing Sheets

METHOD, SYSTEM, AND COMPUTER PROGRAM PRODUCT FOR LIMITING AUTHORIZATION OF AN EXECUTABLE ACTION TO AN APPLICATION SESSION

BACKGROUND OF THE INVENTION

1. Field of the Invention

The present invention generally relates to controlling the execution of actions on a computer system, and more specifically relates to a method, system, and computer program product for limiting authorization of an executable action to an application session.

2. Related Art

Lotus Notes includes an Execution Control List (ECL) that allows users to control what code can be executed on a user's computer system based on who signed the code. The ECL enables users to protect their data and computer systems against viruses, Trojan horses, and other malicious code. The ECL provides a mechanism for managing whether such code should be allowed to execute and what level of access the code should be permitted. The ECL uses digital signatures to verify executable code. When an attempt is made to execute a piece of code, Lotus Notes verifies the digital signature on the code and then looks for the user's ECL settings to determine whether the action can be executed or whether the user should be prompted. If the signer of the code is found in the user's ECL (either explicitly as part of an organization) and the appropriate capability is enabled, the code is executed seamlessly. If the signer's name is not found in the ECL or is found but the capability is not selected, the user is prompted with an Execution Security Alert dialog box showing the action to be performed, who it was signed by (and how the signature was verified), and the capability that is not allowed with the current ECL settings. An example of an Execution Security Alert dialog box 10 is illustrated in FIG. 1. As shown, the Execution Security Alert dialog box 10 is configured to prompt a user for which option to take in response to the alert. The options include:

(1) "Do NOT execute the action";
(2) "Execute the action this one time"; and
(3) "Start trusting the signer to execute the action" (i.e., add the signer to the user's ECL).

The second option, "Execute the action this one time" is meant to handle the case where the user does not want to trust the signer forever for a particular action, but wants to allow execution of the action this one time. Unfortunately, the Execution Security Alert dialog box 10 may pop up many times if this action occurs repeatedly during the running of a program, requiring the user to select the second option over and over again. When this situations occurs, it is not unusual for the user to simply select option three, thus allowing the program to perform the action at any time in the future. This has the undesirable effect of reducing security on the user's computer system, as the action may be executed at any time in the future without the user being alerted.

Sun Java JAAS (Java Authentication and Authorization Service) provides another model for fine tuning execution control permissions. In this model, a policy file is used to indicate that an entity represented by a principal, executing a specified code, has a designated permission. This is an all or nothing permission model, and the permission is persistent until the policy file is updated. Unfortunately, over time, users will often trade security for more convenience in this type of all or nothing model by always granting permission, thus exposing their computer systems to security threats.

Another model for fine tuning execution control permissions is used mostly in relational databases. This model is very similar to the Sun Java JAAS model. In particular, a user is granted (read, write, delete) permission against some data element in the database. In this model, as in the Sun Java JAAS model, the permission is either all or nothing; either a user has permission until further intervention or the user has no permission.

SUMMARY OF THE INVENTION

In general, the present invention provides a method, system, and computer program product for limiting authorization of an executable action to an application session.

A first aspect of the present invention is directed to a method for limiting authorization of an executable action, comprising: generating an alert in response to an execution of an action in an application; and allowing a user to temporarily authorize the execution of the action for a current session of the application.

A second aspect of the present invention is directed to a system for limiting authorization of an executable action, comprising: a system for generating an alert in response to an execution of an action in an application; and a system for allowing a user to temporarily authorize the execution of the action for a current session of the application.

A third aspect of the present invention is directed to a program product stored on a computer readable medium for limiting authorization of an executable action, the computer readable medium comprising program code for performing the following steps: generating an alert in response to an execution of an action in an application; and allowing a user to temporarily authorize the execution of the action for a current session of the application.

A fourth aspect of the present invention provides a method for deploying an application for limiting authorization of an executable action, comprising: providing a computer infrastructure being operable to: generate an alert in response to an execution of an action in an application; and allow a user to temporarily authorize the execution of the action for a current session of the application.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 2:
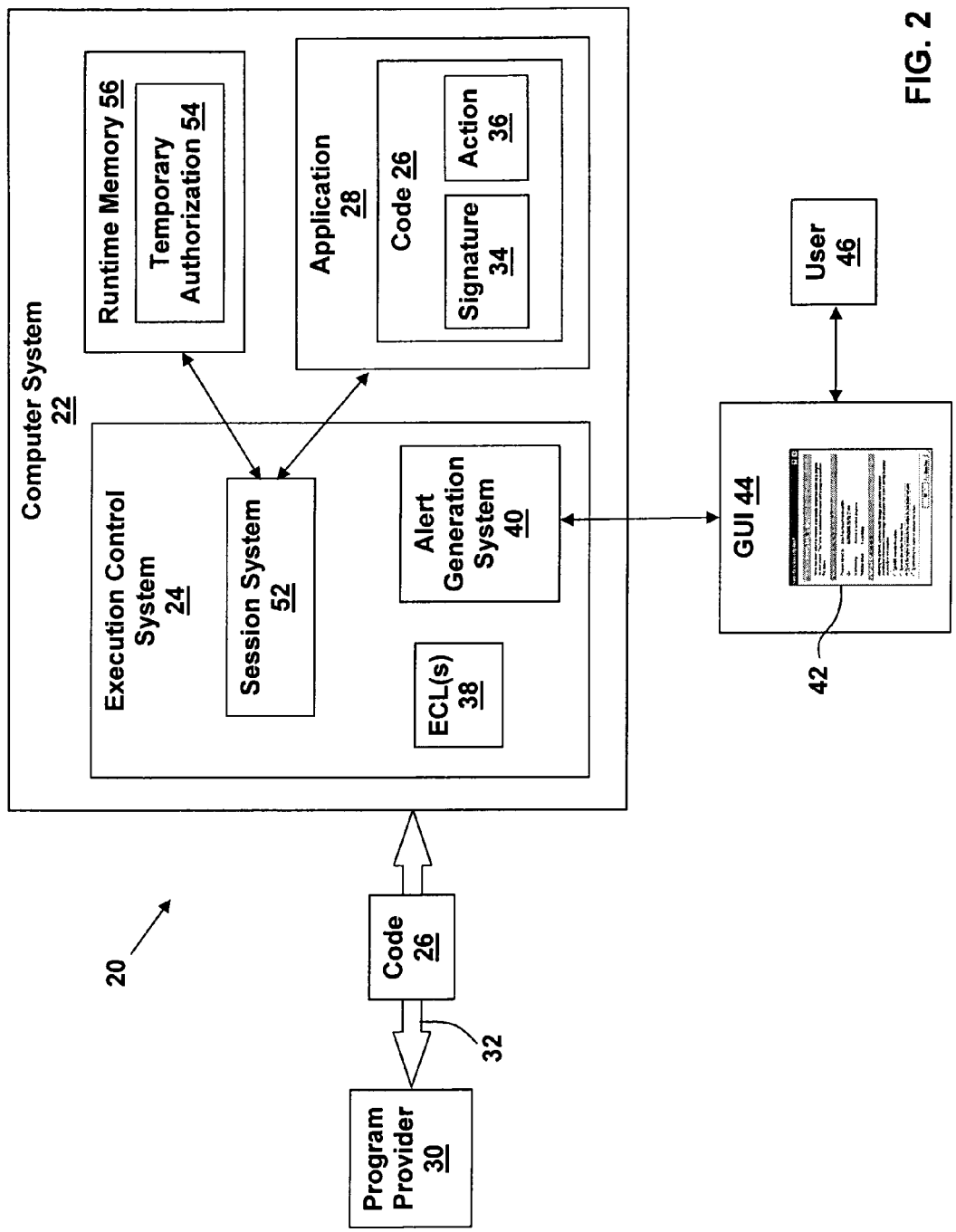
FIG. 2 depicts an illustrative system for limiting authorization of an executable action to an application session in accordance with an embodiment of the present invention.

An illustrative system 20 for limiting authorization of an executable action to an application session in accordance with an embodiment of the present invention. is depicted in FIG. 2. The system 20 includes a computer system 22 having an execution control system 24 that controls what code 26 can be executed by an application 28 running on the computer system 22. The application 28 can comprise any application, e.g., an operating system, client program, etc., capable of executing/running code 26. The code 26 can comprise any type of executable code and can originate from any source. In the illustrative embodiment shown in FIG. 2, for example, the code 26 is provided to the application 28 by a program provider 30 via a communication channel 32. The program provider 30 can, for example, comprise a service provider, a web site, a server, another computer system, a database, a memory source, etc.

Figure 3:
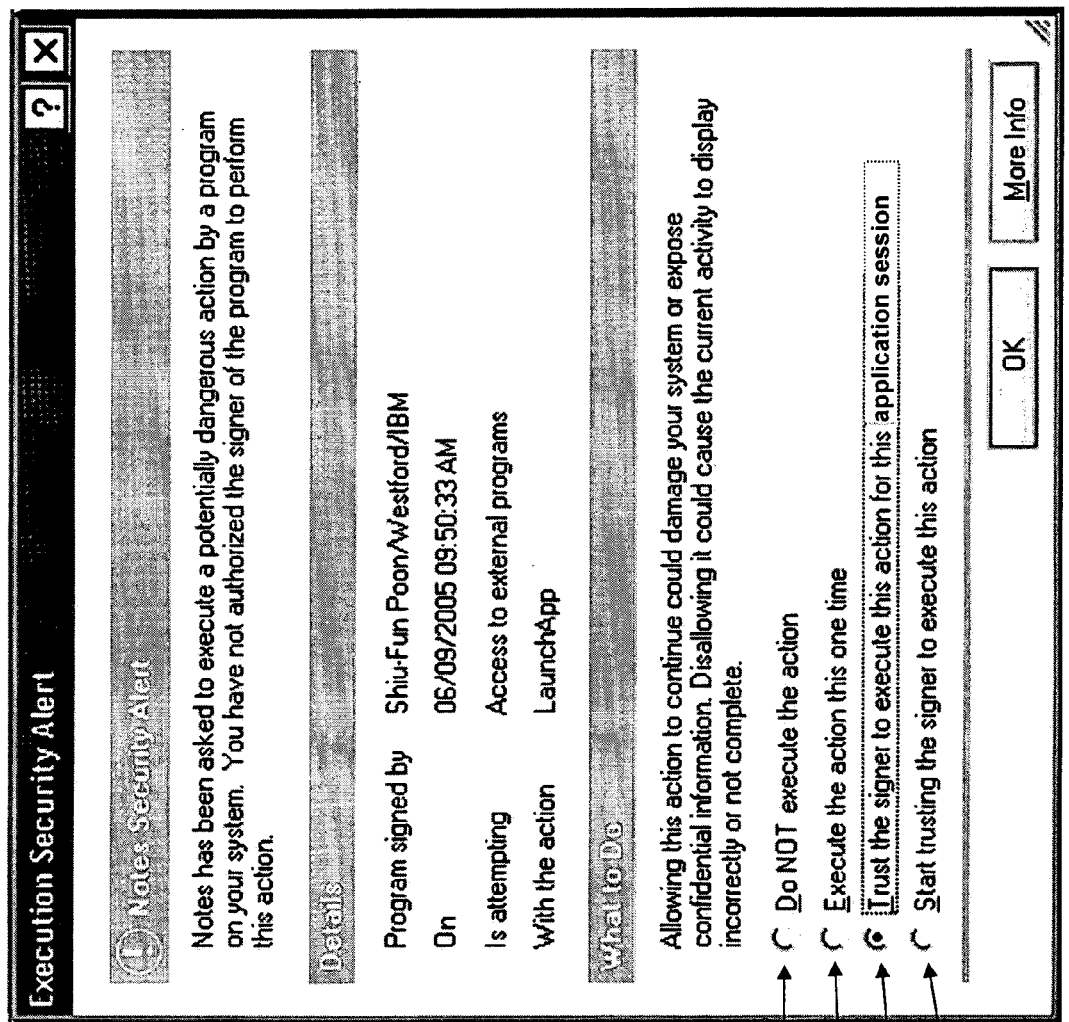
FIG. 3 depicts an illustrative Execution Security Alert dialog box in accordance with an embodiment of the present invention.

The code 26 may include a digital signature 34 from a signer of the code (e.g., program provider 30) and at least one type of action 36 that is subject to control by the execution control system 24. The action 36 can comprise any type of operation that can be executed on computer system 22, such as sending email, modifying files, etc. When the code 26 attempts to execute the action 36, the execution control system 24 accesses at least one execution control list (ECL) 38 to determine if the signer of the code 26 is allowed to perform the action 36 on the computer system 22. If the execution control system 24 determines that the action 36 has not been enabled for its particular signer in the ECL 38, or if the signer is not listed in the ECL 38, then an alert generation system 40 generates an alert 42 via a graphical user interface (GUI) 44 to a user 46 of the computer system 22. An example of an alert 42 in the form of a pop-up Execution Security Alert dialog box 48 is illustrated in FIG. 3.

The Execution Security Alert dialog box 48 prompts the user 46 to choose which of a plurality of options 50A-D to take in response to the alert 42. The options 50A-D include:

Option 50A: "Do NOT execute the action";
Option 50B "Execute the action this one time";
Option 50C "Trust the signer to execute this action for this application session"; and
Option 50D "Start trusting the signer to execute the action."

Figure 1:
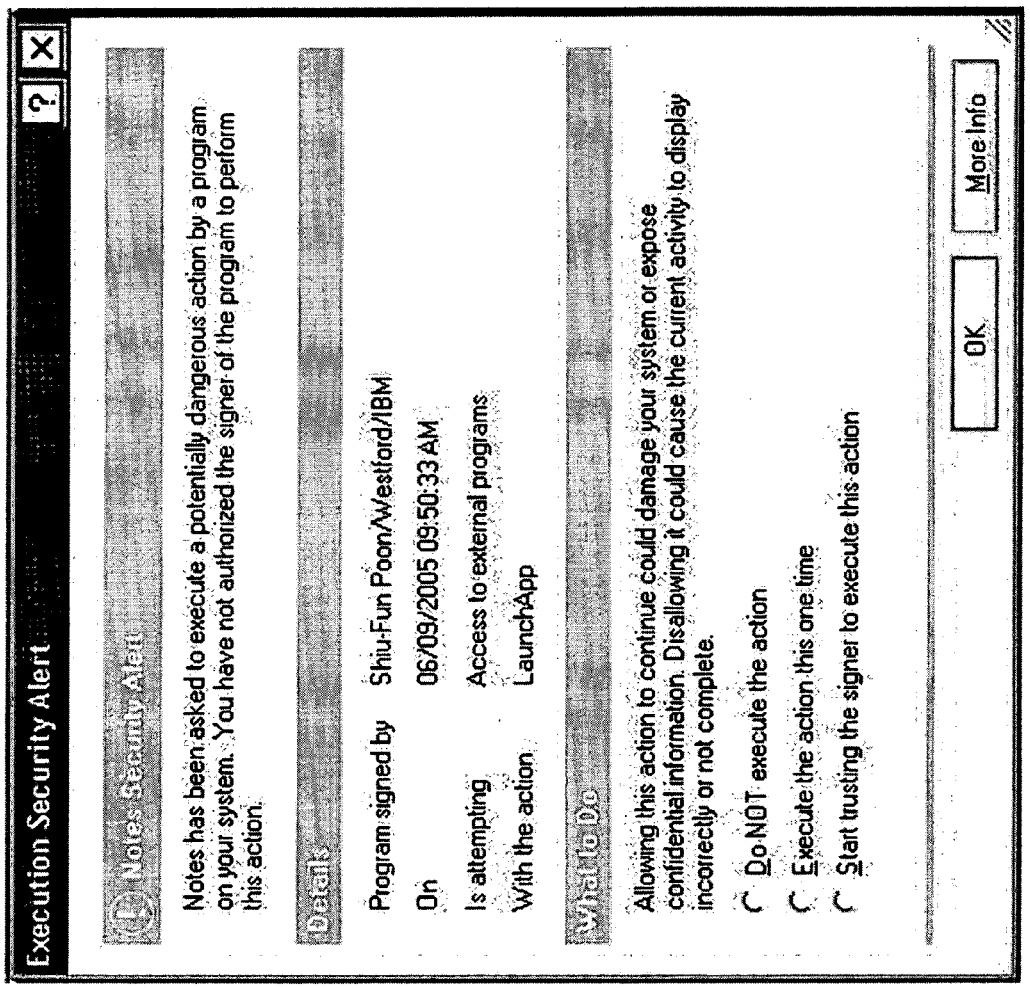
FIG. 1 depicts an illustrative Execution Security Alert dialog box in accordance with the prior art.

Options 50A, 50B, and 50D comprise standard options also provided in the Execution Security Alert dialog box 10 shown in FIG. 1. In general, option 50A will cause the action 36 to be skipped (i.e., not executed), option 50B will allow the action 36 to be executed without adding the signer to the ECL 38, and option 50D will allow the action 36 to be executed and the signer to be added to the ECL 38.

In accordance with the present invention, selection of option 50C, "Trust the signer to execute this action for this application session," causes the execution control system 24 to allow the action 36 to be executed as many times as necessary for the remaining duration of the current application 28 session, without requiring further intervention by the user 46 of the computer system 22. This provides a temporary authorization for the signer of the code 26 to perform the action 36 during the application 28 session. To this extent, the user 46 of the computer system 22 is not repeatedly prompted (e.g., via the Execution Security Alert dialog box 48) to chose which option 50A-D to take each time the action 36 is re-executed during the application session.

Once the application 28 session ends (e.g., when a user exits/quits the application 28), the execution control system 24 no longer allows the action 36 to be automatically re-executed. If the application 28 is started again, and the code 26 attempts to execute the action 36, the alert generation system 40 of the execution control system 24 will once again generate an alert 42 (i.e., Execution Security Alert dialog box 48 in this example) prompting the user 46 of the computer system 22 to choose which option 50A-D to take in response to the alert 42.

The present invention provides a model in which the execution right of an action is set tightly (i.e., more secure) when an application is first launched. During the running of the application, however, a user can selectively grant permission for code signed by other entities to be executed as the need arises during the application session (thus providing less security, but more convenience). Once the application is terminated, the execution right of the action is reset back to its original, more secure version. This model provides a tradeoff before security and convenience for the user running the application.

To implement the above functionality, the execution control system 24 includes a session system 52. When option 50C is selected in response to an alert 42, the session system 52 stores a temporary authorization 54 for the action 36 in a runtime memory 56. When an execution request for a given action 36 is received, the runtime memory 56 is checked first for the presence of a corresponding temporary authorization 54 for that action 36. If a corresponding temporary authorization 54 for the action 36 is present in the runtime memory 56, the action 36 is executed. If not, the ECL 38 is checked in a standard manner to determine if the signer of the code 26 is allowed to perform the action 36 on the computer system 22. When the application 28 session is terminated, the session system 52 clears the temporary authorization 54 for the action 36 from the runtime memory 56.

Figure 4:
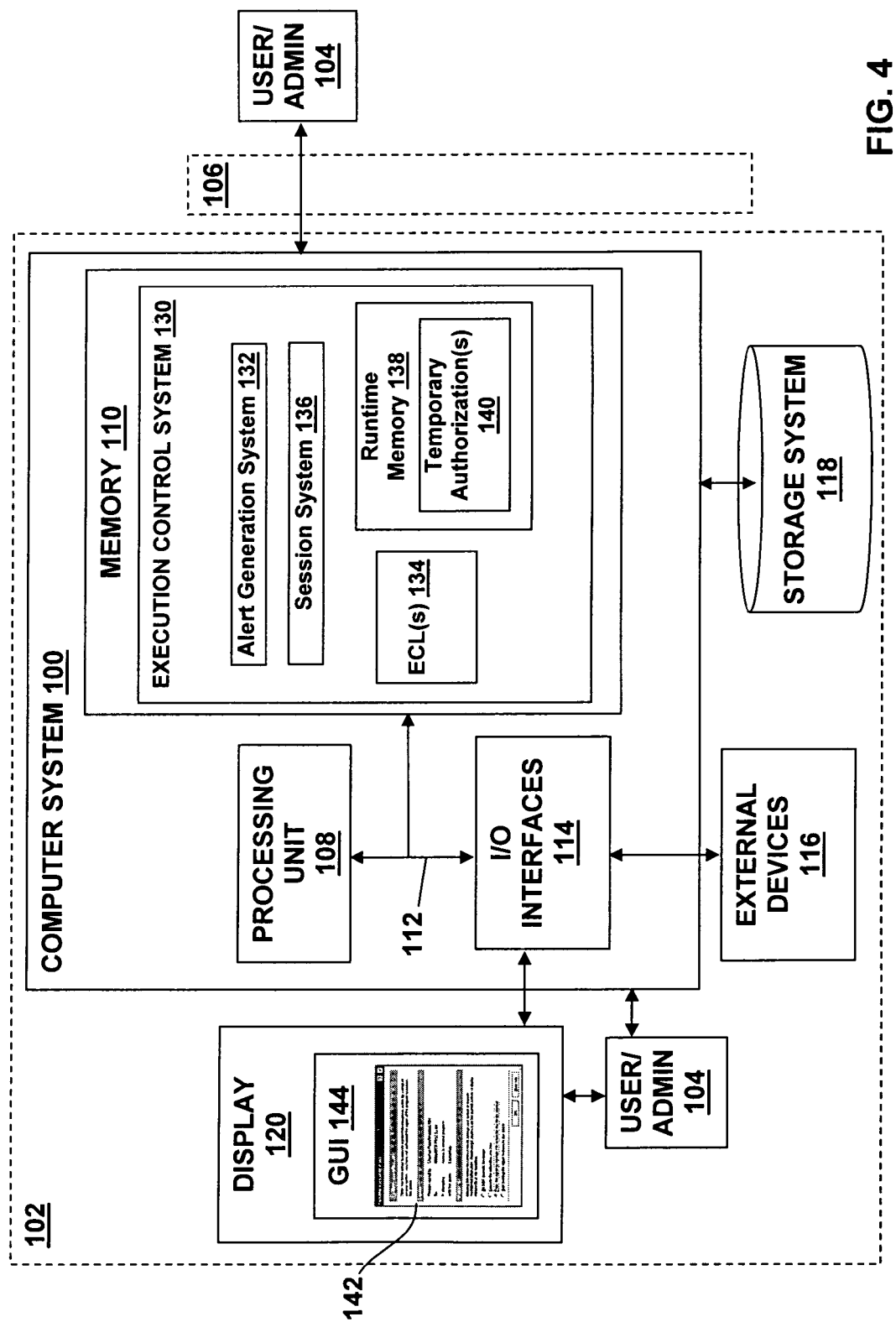
FIG. 4 depicts an illustrative computer system for implementing an embodiment of the present invention.

A computer system 100 for implementing a method for limiting authorization of an executable action to an application session in accordance with an embodiment of the present invention is depicted in FIG. 4. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that provides for the limiting of authorization of an executable action to an application session in accordance with the present invention. It should be appreciated that a user/administrator 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as execution control system 130, that is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 4 can be included in computer system 100. However, if computer system 100 comprises a handheld device or the like, it is understood that one or more external devices/resources 116 (e.g., a display) and/or one or more storage system(s) 118 can be contained within computer system 100, and not externally as shown.

Storage system(s) 118 can be any type of system (e.g., a database) capable of providing storage for information under the present invention. Such information can include, for example, ECLs, alerts, code, applications, signatures, temporary authorizations, etc. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user/administrator 104 can contain computerized components similar to those described above with regard to computer system 100.

Shown in memory 110 (e.g., as a computer program product) is an execution control system 130 for limiting authorization of an executable action to an application session in accordance with an embodiment of the present invention. The execution control system 130 includes an alert generation system 132, ECL(s) 134, and a session system 136. A portion of the memory 110 can be set aside to provide a runtime memory 138 for storing temporary authorization(s) 140.

When a piece of application code attempts to execute an action, the execution control system 130 accesses the ECL(s) 134 to determine if the signer of the code is allowed to perform the action on the computer system 100. If the execution control system 130 determines that the action has not been enabled for its particular signer in the ECL(s) 134, or if the signer is not listed in the ECL(s) 134, then the alert generation system 132 generates an alert 142 via a graphical user interface (GUI) 144 on the display 120. As described above with regard to FIG. 3, the alert 142 presents several different options to the user including, for example, "Trust the signer to execute this action for this application session" (or something to that effect). When this option is selected by the user, the execution control system 130 allows the action to be executed as many times as necessary for the remaining duration of the current application session, without requiring further intervention by the user of the computer system 100. In particular, the session system 136 stores a temporary authorization 140 for the action in the runtime memory 138. When an execution request for the same action is received, and the runtime memory 138 includes a temporary authorization 140 for the action, the action is executed. When the application session is terminated, the session system 136 clears the temporary authorization 140 for the action from the runtime memory 138.

The present invention can be offered as a business method on a subscription or fee basis. For example, one or more components of the present invention can be created, maintained, supported, and/or deployed by a service provider that offers the functions described herein for customers. That is, a service provider can be used to limit authorization of an executable action to an application session, as described above.

It should also be understood that the present invention can be realized in hardware, software, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk—read only disk (CD-ROM), a compact disk—read/write disk (CD-tUW), and a digital versatile disk (DVD).

Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for limiting authorization of an executable action, comprising:
    generating an alert in response to a first execution of an action in an application during a current session of the application, wherein the application is configured to execute the action a plurality of times, wherein the generating of the alert includes displaying a dialog box prompting the user to select one of a plurality of options, wherein the plurality of options comprise:
    do not execute the action;
    execute the action this one time;
    execute the action for the current session of the application; and
    always execute the action;
    allowing a user to temporarily authorize the execution of the action for only the current session of the application, and
    storing a temporary authorization for the action in a runtime memory on a computer of the user;
    wherein, in response to the user temporarily authorizing the execution of the action for only the current session, and in response to subsequent execution of the action in the application during the current session, not generating a subsequent alert, and wherein the temporary authorization terminates when the session ends.

2. The method of claim 1, wherein the terminating of the temporary authorization includes:
    deleting the temporary authorization from the runtime memory when the current application session ends.

3. The method of claim 1, further comprising:
    checking the runtime memory for the temporary authorization each time the action is executed during the application session.

4. Deploying an application for limiting authorization of an executable action, comprising:
    providing a computer infrastructure being operable to perform the method of claim 1.

5. A system for limiting authorization of an executable action, comprising:
    a computing device that includes:
    a system for generating an alert in response to a first execution of an action in an application during a current session of the application, wherein the application is configured to execute the action a plurality of times, wherein the system for generating the alert includes a system for displaying a dialog box prompting the user to select one of a plurality of options, wherein the plurality of options comprise:
    do not execute the action;
    execute the action this one time;
    execute the action for the current session of the application; and
    always execute the action;
    a system for allowing a user to temporarily authorize the execution of the action for only the current session of the application, and
    a system for storing a temporary authorization for the action in a runtime memory on a computer of the user;
    wherein, in response to the user temporarily authorizing the execution of the action for only the current session, and in response to subsequent execution of the action in the application during the current session, the system for generating the alert does not generating subsequent alert, and wherein the temporary authorization terminates when the session ends.

6. The system of claim 5, wherein the terminating of the temporary authorization includes using: a system for deleting the temporary authorization from the runtime memory when the current application session ends.

7. The system of claim 5, further comprising:
    a system for checking the runtime memory for the temporary authorization each time the action is executed during the application session.

8. A program product stored on a computer readable storage medium for limiting authorization of an executable action, the computer readable medium comprising program code for performing:
    generating an alert in response to a first execution of an action in an application during a current session of the application, wherein the application is configured to execute the action a plurality of times, wherein the generating of the alert includes displaying a dialog box prompting the user to select one of a plurality of options, wherein the plurality of options comprise:
    do not execute the action;
    execute the action this one time;
    execute the action for the current session of the application; and
    always execute the action;
    allowing a user to temporarily authorize the execution of the action for only the current session of the application, and
    storing a temporary authorization for the action in a runtime memory on a computer of the user;
    wherein, in response to the user temporarily authorizing the execution of the action for only the current session, and in response to subsequent execution of the action in the application during the current session, not generating a subsequent alert, and wherein the temporary authorization terminates when the session ends.

9. The program product of claim 8, further comprising program code for:
    deleting the temporary authorization from the runtime memory when the current application session ends.

10. The program product of claim 8, further comprising program code for:
    checking the runtime memory for the temporary authorization each time the action is executed during the application session.

* * * * *